H. KELLY.
FRUIT-GRINDER.

No. 188,059. Patented March 6, 1877.

WITNESSES
Frederick Robinson Strong
Thomas Nelson Strong

INVENTOR
Hampton Kelly

UNITED STATES PATENT OFFICE.

HAMPTON KELLY, OF EAST PORTLAND, OREGON.

IMPROVEMENT IN FRUIT-GRINDERS.

Specification forming part of Letters Patent No. 188,059, dated March 6, 1877; application filed January 22, 1877.

*To all whom it may concern:*

Figure 1:
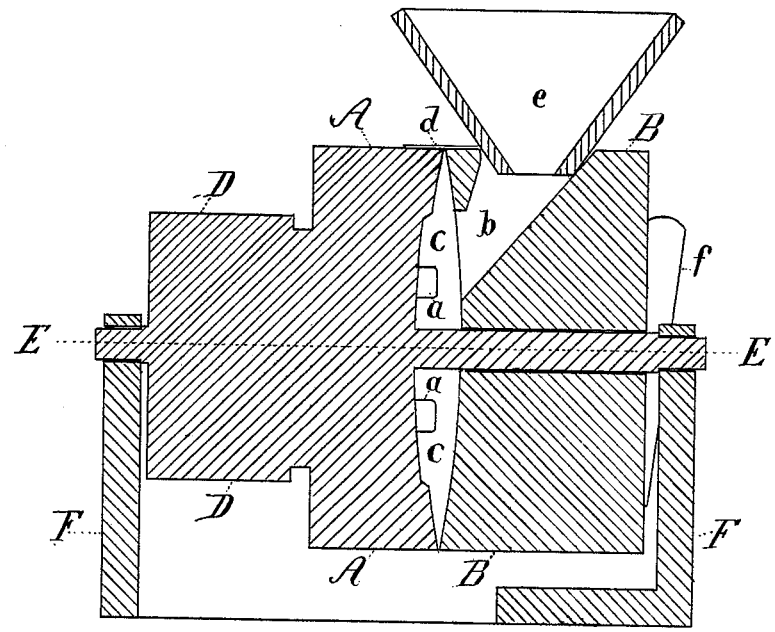

Be it known that I, HAMPTON KELLY, of East Portland, in the county of Multnomah and State of Oregon, have invented an Improved Fruit-Grinding Machine, of which the following is a specification:

The object of my invention is to grind or crush fruits and vegetables rapidly and economically by the combination, in a fruit and vegetable grinding-machine, of the two perpendicular grinders A A and B B, with concave grinding-faces abutting against each other, forming the concavity C C, and, with the driving-drum D D, the teeth or cogs $a\ a$, the hopper $e$, and feed-channel $b$, as shown in the vertical side section, Figure 1, of the accompanying drawing.

The shaft E E, to which the grinder A is permanently fixed, passes entirely through the centers of both grinders to its bearing in the frame-work F F, and revolves within and acts as a support to the grinder B B.

While in use, the grinder B B is locked in any desired position, and the grinder A A is kept in constant and rapid revolution by means of a driving-belt passing around the drum D D, or by other appropriate mechanism.

The fruit or vegetable desired to be ground is fed into the hopper $e$, and passing thence through the feed-channel $b$ into the concavity C C, between the grinders A A and B B, is first broken up by the teeth or cogs $a\ a$, permanently attached to and revolving with the grinder A A, and is then more thoroughly broken up and crushed by the abutting surfaces of the two grinders near their circumferences. The product then passes down and out between the grinders into suitable reservoirs provided for its reception.

The escape of the pulp above is prevented by the closely-fitting band $d$, and the closeness of contact of the two grinders is regulated by setting-screws, or by keys or wedges acting upon the grinder B B, one of which is represented by the reference-letter $f$ in the drawing, Fig. 1.

Figure 2:
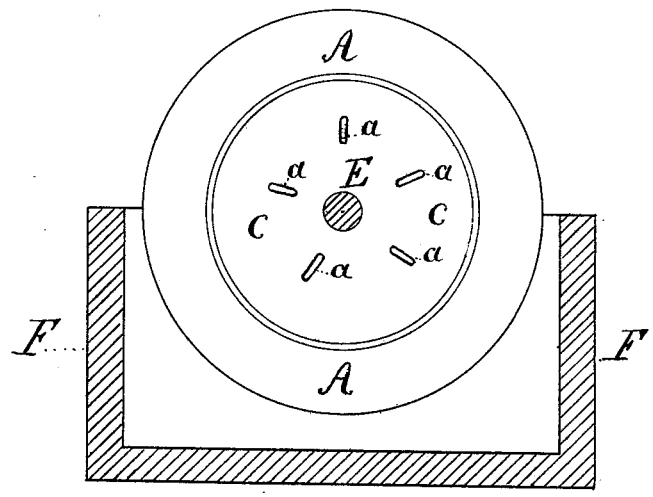

Fig. 2 represents an end view of the grinder A A, showing its face-shape, which is the same as that of B B, and the relative positions of the shaft E, the teeth or cogs $a\ a\ a\ a$, the concave surface C C, and the framework F F.

The grinders may be made of wood, stone, or metal, and the fruits and vegetables intended to be crushed or ground by this device are apples, pears, peaches, beets, potatoes, and all other garden fruits and vegetables capable of being crushed or ground.

I claim as my invention—

The combination, in a fruit-grinding machine, substantially as described, of two perpendicular circular grinders of concave abutting faces with the teeth or cogs, feed-channel, hopper, shaft, band, and driving-drum, hereinabove described.

HAMPTON KELLY.

Witnesses:
FREDERICK ROBINSON STRONG,
THOMAS NELSON STRONG.